(12) United States Patent
Bouton

(10) Patent No.: US 11,514,012 B2
(45) Date of Patent: Nov. 29, 2022

(54) METHOD AND SYSTEM FOR GENERATING AND USING A MASTER ENTITY ASSOCIATIVE DATA NETWORK

(71) Applicant: REFINITIV US ORGANIZATION LLC, New York, NY (US)

(72) Inventor: Christopher M. L. Bouton, Newbury, MA (US)

(73) Assignee: Refinitiv US Organization LLC, New York, NY (US)

( * ) Notice: Subject to any disclaimer, the term of this patent is extended or adjusted under 35 U.S.C. 154(b) by 1022 days.

(21) Appl. No.: 14/193,977

(22) Filed: Feb. 28, 2014

(65) Prior Publication Data

US 2014/0280194 A1 Sep. 18, 2014

Related U.S. Application Data

(60) Provisional application No. 61/788,010, filed on Mar. 15, 2013.

(51) Int. Cl.
| | |
|---|---|
| *G06F 16/31* | (2019.01) |
| *G06F 16/22* | (2019.01) |
| *G06F 16/11* | (2019.01) |
| *G06F 16/84* | (2019.01) |

(52) U.S. Cl.
CPC ........ *G06F 16/2228* (2019.01); *G06F 16/116* (2019.01); *G06F 16/31* (2019.01); *G06F 16/84* (2019.01)

(58) Field of Classification Search
CPC ......... G06F 17/30321; G06F 17/30914; G06F 17/30076; G06F 17/30613; G06F 17/30; G06F 16/2228; G06F 16/84; G06F 16/31; G06F 16/116; G06F 16/00

USPC .......................................................... 707/741
See application file for complete search history.

(56) References Cited

U.S. PATENT DOCUMENTS

| | | | |
|---|---|---|---|
| 2006/0052939 A1* | 3/2006 | Bugrim | A61P 7/02 |
| | | | 702/19 |
| 2007/0011175 A1* | 1/2007 | Langseth | G06F 16/254 |
| 2008/0243767 A1 | 10/2008 | Naibo et al. | |
| 2009/0198678 A1* | 8/2009 | Conrad | G06F 16/23 |

(Continued)

OTHER PUBLICATIONS

International Search Report for International Application PCT/US2014/019517, dated Jul. 18, 2014.

(Continued)

*Primary Examiner* — Hosain T Alam
*Assistant Examiner* — Tracy M McGhee
(74) *Attorney, Agent, or Firm* — Norton Rose Fulbright US LLP

(57) ABSTRACT

A method and system for generating and using a master entity associative data network. The master entity associative data network system includes data sources storing data entities. Each data entity is of a specific entity type having specific entity properties, associations to other data entities, and an assigned common identifier label. Also, the master entity associative data network system includes a data processor configured to extract data entities from the data sources and extract associations to other data entities. The data processor stitches the data entities to each other based on at least one or more of the extracted associations, specific entity properties, and the common identifier label to generate one or more master data entities.

26 Claims, 11 Drawing Sheets

(56) References Cited

U.S. PATENT DOCUMENTS

| | | | | |
|---|---|---|---|---|
| 2011/0191349 A1* | 8/2011 | Ford | ..................... | G06F 16/285 |
| | | | | 707/741 |
| 2011/0225167 A1* | 9/2011 | Bhattacharjee | ....... | G06F 16/284 |
| | | | | 711/E12.001 |
| 2012/0203747 A1* | 8/2012 | Douetteau | ............. | G06F 16/951 |
| | | | | 707/696 |
| 2013/0054605 A1* | 2/2013 | Yeh | ....................... | G06F 16/258 |
| | | | | 707/17.046 |

OTHER PUBLICATIONS

"Master data management"—Wikipedia, the free encyclopedia downloaded from http://en.wikipedia.org/wiki/Master_data_management on Feb. 22, 2013.

"Ontological Classification in Digital Era: Problems, Reasons, and Solutions" downloaded from http://haozeng.info/2011/ontological-classification-in-digital-era-problems-reasons-and-solutions/on Feb. 22, 2013.

"Semantic Technology and Master Data Management" downloaded from http://semanticweb.com/semantic-technology-and-master-data-management_b12929 on Feb. 22, 2013.

* cited by examiner

FIG. 4

Semantic Data Core (SDC)

Search SOC

Actions ▾ | ✚ TripleMap

Total Source Triples
106,859,576
Total Source Entities
1,484,483
Total SDC Entities
3,313,761
Last Indexing
Completed in 0:06:06 (status: COMPLETE, finished: 10/30/2012 -1:06:06 AM)
Repository Location
/data/triplemap/localStoreMaster Sharepoint Sites
0
Sharepoint Documents
0
PubMad Documents
1,458,224

Actions ▾

Most-Saltched Master Entities
Teva Clinical Study site: 140
Medical Director: 138
GSK Clinical Trial Call Center: 137
Boohringer Ingelisim Investigations site 5:135
Microbia Investigational site: 134
Ironwood Investigational site:133
For additional information regarding investigative sites for the trial, contact 1-877-CTLILLY (1-877-285-4559, 1-317-615-4559) Mon-Fri from 9AM to 5PM Eastern Time (UTO/GMT - 5hours, EST), or speak with your personal RDF & Delimited Text Sources Actions ▾

FIG. 6

Live XML Feeds             [Actions ▾]

☐ [id:1, name:Clinical Trials]
☐ [id:2, name:TR Cortalis]

Relational Databases       [Actions ▾]

☐ [id:1, name:DLC Oracle]

Document Sources           [Actions ▾]

☐ [id:1, name:Oncology Teams te]
☐ [id:2, name:PubTec Full Text]

FIG. 9

METHOD AND SYSTEM FOR GENERATING AND USING A MASTER ENTITY ASSOCIATIVE DATA NETWORK

RELATED APPLICATION

This application claims priority to, and the benefit of, U.S. Provisional Application No. 61/788,010, filed Mar. 15, 2013, for all subject matter common to both applications. The disclosure of said provisional application is hereby incorporated by reference in its entirety.

FIELD OF THE INVENTION

The present invention relates to data management systems suitable for managing data of an organization or many organizations, and more particularly to generate a master entity associative data network using a data processor.

BACKGROUND

As the volume of data available to organizations across many sectors grows, the challenges associated with deriving patterns and connections from that data also grow. Data is being generated very quickly, making it difficult for users to be able to understand and extract meaning from data. Some of the issues arising out of large amounts data include how to integrate the data, how to store the data in a secure and robust way, and how to interpret or understand the data.

One solution is to use a data management system. Data management systems govern the core data needed to run a business in data standardization, architecture, and governance. The main purpose is to establish an "authoritative source" of the data for an organization.

A data management system includes processes, policies, standards, and tools to define and manage data of an organization. In particular, a data management system incorporates rules used to prevent incorrect data from being used in the system by creating the "authoritative source" of data. The data management system collects, aggregates, consolidates, matches, and distributes data throughout an organization to keep consistency and control in the use of data. For example, the data management system is used to prevent multiple versions of the same data from being used simultaneously, which can frequently occur in larger organizations.

Data management systems may include modules for source identification, data collection, data transformation, normalization, rule administration, data consolidation, data storage, data distribution, data classification, item master creation, product codification, data enrichment, and data governance. Some of the tools used with these modules include data networks, file systems, data store, data mining, data analysis, data virtualization, data federation, and data visualization. Data management systems also provide end-user searches such as involving keyword searching in document sources.

Data and other information have also been organized in online databases for organizations. However, this type of service has had problems with finding a useful method of searching for the desired information. Some users have found navigating these types of websites difficult due to the complexity of the structure used to organize the large amounts of data and information. The online database may be helpful for managing the information or data but poses problems in terms of searching and finding desired information or data.

Ontological classification has been suggested as a solution for grouping data together based on relations to a pre-defined group. One example within ontological classification includes aggregating various classification schemes together with proper algorithms for managing the data. With this example, although a scheme may not be useful alone, the combination of schemes enables for a more useful overall classification and makes it easier for a user to search for data. Each ontological classification does not typically work as well by itself due to large variations on user expected classification schemes.

Semantic technology is another solution with respect to data standardization and architecture. Semantic technology differs from traditional databases in that two or more instances are allowed to refer to the same data entity. More particularly, semantic technology describes itself in a machine processable form where semantics are embedded throughout the data. This allows definitions to be built over time. For example, once a term is defined, it can be used in another part of the ontology of the system. Thus, semantic technology can be used to help data management systems with agreement on definitions and management of data.

SUMMARY

In particular, there is a need for an improved method and system for users to be able to "connect the dots" across data sources, both structured (e.g. databases, XML, delimited) and unstructured (e.g. text), to analyze the data entities across these sources and the connections between them. However, this issue has not been adequately addressed or solved by the conventional data management systems, online databases, or semantic technology.

The present invention is directed to a system and method of generating or using a master entity associative data network having a data processor to manage the data. In particular, this system and method is directed to a methodology for parallel generation of a continuously updating master entity to master entity associative data network. The present invention is directed to a method and system that allows an end-user to interact with an integrated, high-performance, data network comprised of all mapped master entity types and all of their associations. The present invention is directed toward further solutions to address this need, in addition to having other desirable characteristics.

In accordance with an embodiment of the present invention, a computer implemented method of generating a master entity associative data network includes converting data from one or more sources to a computable relationship format. The computable relationship format is imported to a unified data core. Data entities from the computable relationship format in the unified data core are extracted. Each data entity is of a specific entity type having specific entity properties, associations to other data entities, and an assigned common identifier label. The associations between the data entities are extracted. The data entities are stitched to each other based on at least one or more of the extracted associations, specific entity properties, and the common identifier label to generate one or more master data entities. Additional associations between the one or more master data entities are extracted based on the extraction of associations between data entities. The master data entities are mapped according to a user preference to form the master entity associative data network.

In accordance with aspects of the present invention, the master data entities can be indexed based on the stitching of the data entities to each other.

In accordance with aspects of the present invention, a unique master identifier label can be assigned to each master data entity.

In accordance with aspects of the present invention, the data is sourced from a relational database management system. In another aspect, the data is extensible markup language, delimited text, RSS feed, structured data, or semi-structured data.

In accordance with aspects of the present invention, additional data can be supplied from an additional source triggering a stitching event to generate master data entities which incorporate the additional data from the additional source. The method can include scanning continuously for one or more stitching events via a parallelized algorithm.

In accordance with aspects of the present invention, stitching data entities to each other can be based on, at least in part, label attribution.

In accordance with aspects of the present invention, a master entity type list can be created based on the specific entity type and/or specific entity properties of extracted data entities. A document can be scanned for master data entities from the master entity type list. The mapping of the master data entities can be based on the master entity type list.

In accordance with aspects of the present invention, a range of facet values can be determined for the specific entity properties of each specific entity type. The range determination allows for the filtration of data entities based on a search for a specific entity type.

In accordance with aspects of the present invention, the master entity associative data network can include an ontological classification of specific entity types.

In accordance with aspects of the present invention, all data can be indexed across the master data entities enabling a search of any attribute for any master data entity.

In accordance with aspects of the present invention, a document can be scanned, using a named entity recognition process, in order to identify an existence of one or more master data entities contained in the document. One or more novel data linkages can be created between the document, in which the one or more master data entities is located, and the contained one or more master data entities.

In accordance with an embodiment of the present invention, a master entity associative data network system includes one or more data sources storing data entities. Each data entity is of a specific entity type having specific entity properties, associations to other data entities, and an assigned common identifier label. The master entity associative data network system also includes a data processor configured to extract data entities from the data sources and extract the associations between the data entities. The data processor stitches the data entities to each other based on at least one or more of the extracted associations, specific entity properties, and the common identifier label to generate one or more master data entities.

In accordance with aspects of the present invention, the data processor can convert the data sources to a computable relationship format.

In accordance with aspects of the present invention, the data processor can assign each master data entity a unique master identifier label for the purposes of identification of that particular master data entity. The data processor can stitch the master data entities to each other based on the unique master identifier label assigned to each of the master data entities.

In accordance with aspects of the present invention, the data processor can index all of the data entities. The data processor can index the data entities based on at least one or more of the extracted associations, specific entity properties, and the assigned common identifier labels.

In accordance with aspects of the present invention, the data processor can map the master data entities according to a user preference to form the master entity associative data network.

In accordance with aspects of the present invention, the data processor can map the master data entities according to a plurality of user-defined master entity types to form the master entity associative data network. The user-defined master entity types can be People, Events, Locations, and Groups or Proteins, Genes, Compounds, Pathways, and Diseases.

BRIEF DESCRIPTION OF THE FIGURES

These and other characteristics of the present invention will be more fully understood by reference to the following detailed description in conjunction with the attached drawings, in which:

FIG. 4 is a computer display illustrating a results page from a search performed on the search page of FIG. 3 according to one aspect of the present invention;

FIG. 6 is a computer display illustrating the data processor interface according to one aspect of the present invention;

FIG. 9 is a computer display illustrating the ability to connect across both structured data (i.e. databases, XML, delimited) and unstructured data (i.e. document sources) using the data processor according to one aspect of the present invention;

DETAILED DESCRIPTION

Figure 1:
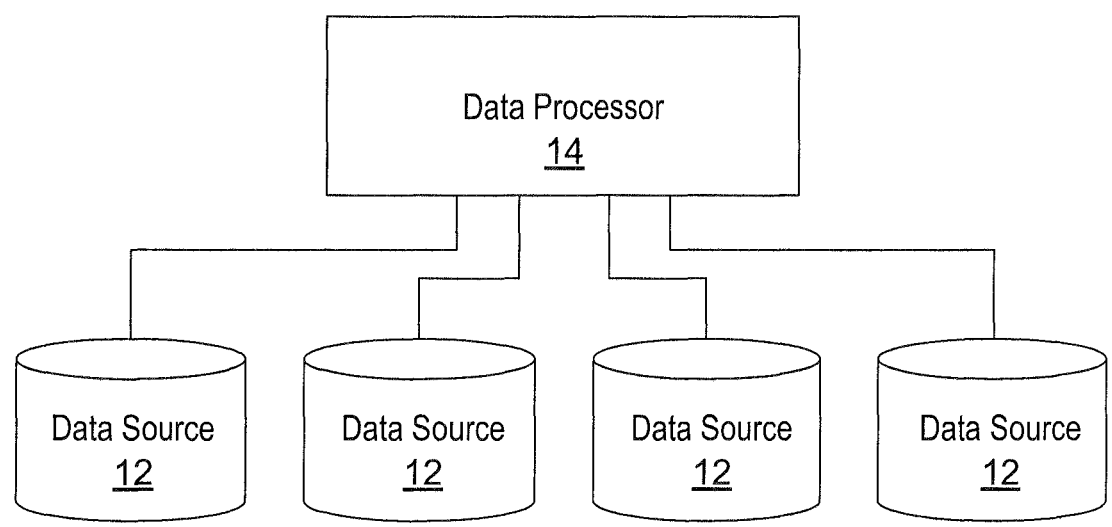
FIG. 1 is a schematic view of a master entity associative data network system according to an embodiment of the present invention.

An illustrative embodiment of the present invention relates to a master entity associative data network system including data sources storing data entities. Each data entity is of a specific entity type having specific entity properties, associations to other data entities, and an assigned common identifier label. Also, the master entity associative data network system includes a data processor configured to extract data entities from the data sources and extract associations between the data entities. The data processor stitches the data entities to each other based on at least one or more of the extracted associations, specific entity properties, and the common identifier label, to generate one or more master data entities.

FIGS. 1 through 11, wherein like parts are designated by like reference numerals throughout, illustrate example embodiments of a master entity associative data network system and method of generating a master entity associative data network according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed, such as order of steps, combination or division of one or more steps, inclusion of more or less modules, implementation in different computing environments or systems, and the like, all in a manner still in keeping with the spirit and scope of the present invention.

To provide the following capabilities to users, the present invention is directed to the ability to generate a master entity associative data network that is based on the definition of "master entities." This allows a user to define and then integrate information about data entities as master data entities from a wide range of sources, aggregate the metadata about each data entity from across those sources, derive associations between data entities from these sources, index all of the data content for high-performance search purposes, and provide the user with the ability to traverse master data entity to master data entity associations.

FIG. 1 depicts a master entity associative data network system 10. The master entity associative data network system 10 includes data sources 12. In this example, there are four data sources 12. However, in other examples, any number of data sources 12 may be used, including a single data source. Each of the data sources 12 stores data entities. Each data entity is of a specific entity type having specific entity properties, associations to other data entities, and an assigned common identifier label. A data entity is a data object that has a data type. In one example, the data entity is the result of the evaluation of an expression, or the result of the execution of a function reference (the function result).

The master entity associative data network system 10 also includes a data processor 14 configured to extract data entities from the data sources 12 and extract the associations between the data entities. The data processor 14 stitches the data entities to each other based on at least one or more of the extracted associations, specific entity properties, and a common identifier label to generate one or more master data entities. This system 10 can be used to find connections and similarities between data entities of different entity types to be able to properly organize the data entities within master data entities.

The data processor 14 is enabled to convert data sources 12 to a computable relationship format. In particular, data from data sources 12 may be formatted into a Resource Description Framework (RDF) standard. The master entity associative data network system 10 provides a particular process of structuring and handling of RDF data. Those of skill in the art will appreciate that the computable relationship format can be RDF, as described in the illustrative embodiments herein, or can take the form of any appropriate computable relationship format, such as but not limited to Universal Resource Identifier (URI), Resource Description Format (RDF), Resource Description Format Schema (RDFS), Simple Knowledge Organization System (SKOS), and Web Ontology Language (OWL). For purposes of simplicity, and clarity, the present description will assume the use of the RDF format in most instances; however, the present invention is by no means limited to use with only the RDF format as the computable relationship format.

The data processor 14 is enabled to assign each master data entity a unique master identifier label for identifying each particular master data entity. In one example, the data processor 14 is able to further stitch the master data entities to each other based on the unique master identifier label assigned to each of the master data entities.

The data processor 14 is enabled to index all of the data entities. In one example, the data entities are indexed based on extracted associations between data entities, specific entity properties of the data entities, and the common identifier label assigned to the data entities.

The data processor 14 is enabled to map the master data entities according to a user preference to form the master entity associative data network. In particular, the data processor 14 is enabled to map the master data entities according to user-defined master entity types. A user can be an administrator of the data network. For example, if the master entity associative data network is directed to intelligence data, the user (administrator) may define master entity types as People, Events, Locations, and Groups. Alternatively, in another example, if the master entity associative data network is about life sciences, the user or administrator defines master entity types as Proteins, Genes, Compounds, Pathways, and Diseases. However, the master entity associative data network may be directed to other subject types, and the master entity types may be other conceptual types (i.e. car, helicopter part, electronics product, etc.) as appreciated by one of skill in the art.

Figure 2:
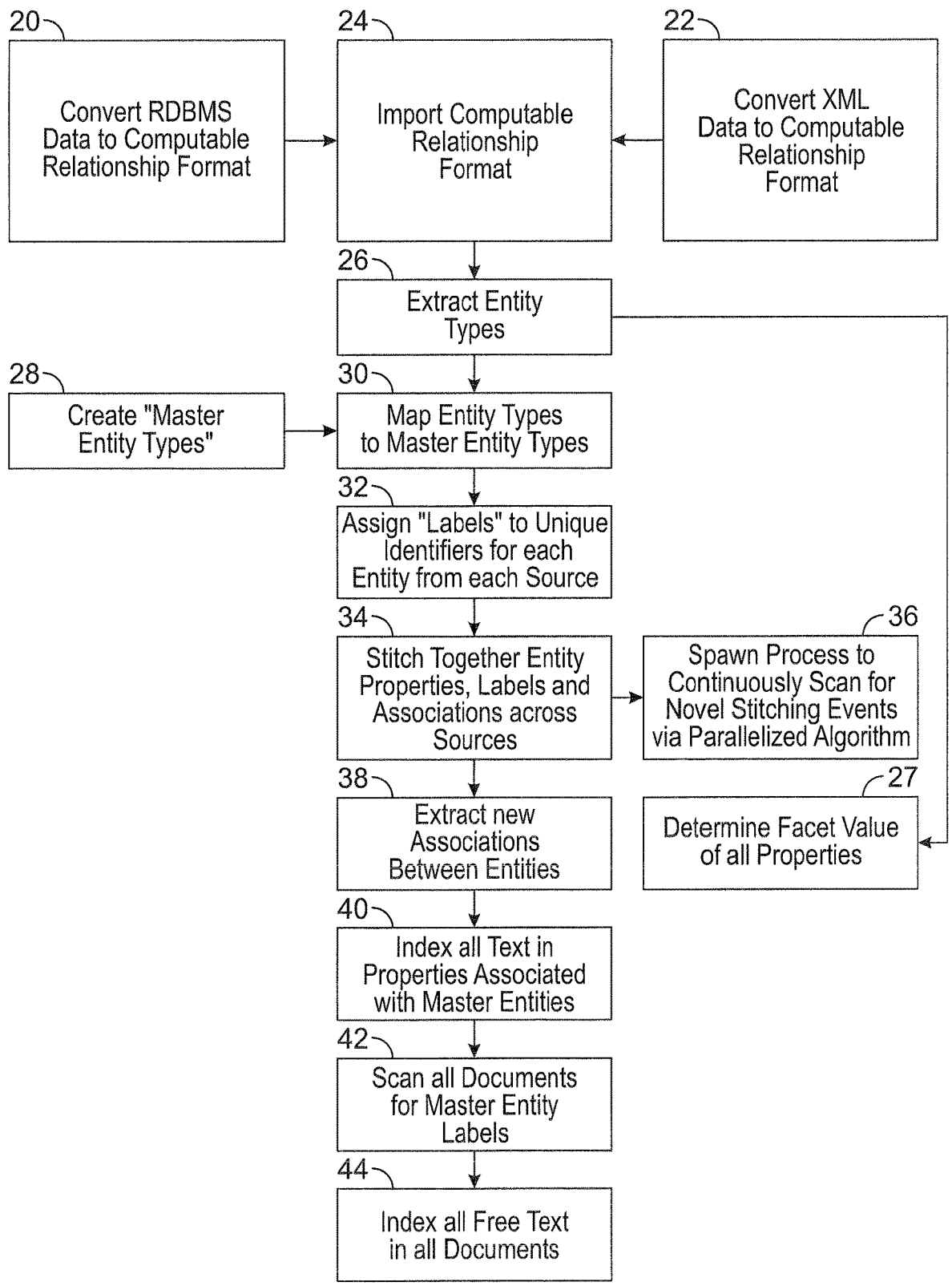
FIG. 2 is a flow chart diagram illustrating a method of generating a master entity associative data network according to one aspect of the present invention.

FIG. 2 illustrates the example steps for generating a master entity associative data network. The generation of a master entity associative data network requires numerous steps that may not necessarily be performed in the example order. In one example, the process incorporates flexible "master entity" definitions, high-performance indexing of raw computable relationship format, such as resource description framework (RDF) format, and a parallel approach to data stitching.

The intent in the generation of a master entity associative data network is to build a system that represents the various data entities across numerous sources 12 as entity types, which can be mapped to classes or master entity types of master data entities, and in addition to extract meta-data for each data entity and the associations between data entities from the sources 12.

In steps 20 and 22, data from the sources 12 is converted to a computable relationship format, such as, e.g., resource description framework format or RDF format. In one example, the original data from the sources 12 is in a relational database management system (RDBMS) format such as structured query language. In another example, the original data from the sources 12 is in extensible markup language format or delimited text format. The computable relationship format is imported into a unified data core (step 24).

In step 26, data entities are extracted from the computable relationship format in the unified data core. Each data entity is of a specific entity type having specific entity properties, associations to other data entities, and an assigned common identifier label. Step 26 also includes extracting the associations between data entities.

In an optional step 27, a range of facet values or a default scale for the specific entity properties of each specific entity type is determined. In general, the facet value range for all specific entity properties is determined. This is used, for example, when searching for a specific entity type. The facet value ranges for each specific entity type allows for the filtration of data entities based on specific entity properties not fitting within the facet value range of the search for a specific entity type.

As discussed above, each data entity is assigned a common identifier label. A common identifier label may be used to link two or more data entities. Examples of common identifier labels include a social security number or identification number such as used in a relational database in which multiple data tables are related to one another through a common identifier. Datasets may be tied together by a common identifier that resides in multiple sets of data. Optional step 32 includes assigning "labels" to unique identifiers (common identifier label) for each data entity from each source (step 32). In another example, the common identifier label has been assigned to the data entity before the data entity is extracted from a source. These common identifier labels may be related to the specific entity type and/or specific entity properties.

In step 34, data entities are stitched to each other based on at least one or more of the specific associations, specific entity properties, and a common identifier label. In particular, entity properties, labels, and associations are stitched across sources 12. This step of stitching the data entities (step 34) generates the master data entities. In one example, stitching the data entities to each other is based partially or completely on label attribution. Label attribution can provide the data processor 14 with the information needed to stitch data entities across data sources 12. In another example, stitching restrictions can be applied that prevent "over-stitching" by blocking certain ambiguous common identifier labels of the data entities from use in the generation process. In another example, parallelized data stitching is used to break down the task of the master data entity creation into numerous data blocks in order to speed up the process.

The generation or creation of master data entities supplies the master entity associative data network system 10 with an ontological classification of the specific entity types to be handled. More particularly, the formed master entity associative data network includes an ontological classification of the specific entity types. These specific entity types can be flexibly added and deleted as needed based on the underlying data sources 12 for the master entity associative data network system 10. Master entity types are created based on the specific entity types extracted or derived from the data sources. Each specific entity type from each data entity of the data sources is mapped to a master entity type.

In an optional step, a "master entity types" list or group is created (step 28). In particular, the master entity type list is created based on the specific entity type and/or specific entity properties of extracted data entities. In one example, a document is scanned for master data entities from the master entity type list. Also, in a further optional step, master data entities are mapped based on the "master entity types" list (step 30).

In one example, additional data is supplied from an additional source 12 triggering a stitching event, similar to step 34, to generate additional master data entities which incorporate the additional data. Optional step 36 responds to this issue by scanning continuously for one or more stitching events that occur via a parallelized algorithm. In particular, the step 36 spawns processes to continuously scan for new or novel stitching events via the parallelized algorithm. Each time data is added to the system 10, step 36 can be run in order to incorporate the specific entity properties, associations to other data entities, and common identifier labels of all the newly added data entities.

In step 38, additional or new associations are extracted between the one or more master data entities based on the extraction of associations between data entities. In general, this step extracts associations between master data entities. Each master data entity can have one or more predicate types which reference other master data entities. The system 10 can automatically identify that a master data entity's predicate type references another master data entity within the full set of data. The system 10 is able to generate an association between two or more master data entities based on this reference.

In step 40, the master data entities are indexed. In particular the master data entities are indexed based on the stitching of the data entities to each other. As shown in FIG. 2, step 40 may include indexing of specific entity properties (i.e. text in properties) associated with the master data entities where the indexing is based on the stitching of data entities to each other. Indexing of all data, such as specific entity properties, across master data entities enables a search of any attribute for any master data entity in the system 10.

An optional step includes assigning a unique master identifier label to each master data entity. In optional step 42, all documents are scanned for the unique master identifier labels or master entity labels. In an alternative step 42, a named entity recognition process is used to scan a document to identify the existence of at least one master data entity contained in the document. This alternative step 42 may further include the creation of at least one novel data linkage between the document, in which the master data entities are located, and the contained master data entities. For example, unstructured document scanning enables the data processor 14 to utilize the full set of master data entities, all of their labels, names, synonyms, symbols and other identifiers in a named entity recognition process in order to identify the existence of mentions of master data entities in documents and the creation of novel or new data linkages between the document and the contained master data entities. In optional step 44, all free text is indexed in all documents scanned in step 42.

In a further step, the master data entities are mapped according to a user preference to form the master entity associative data network. In one example, the master data entities are mapped particularly based on the master entity type list of step 28.

Figure 3:
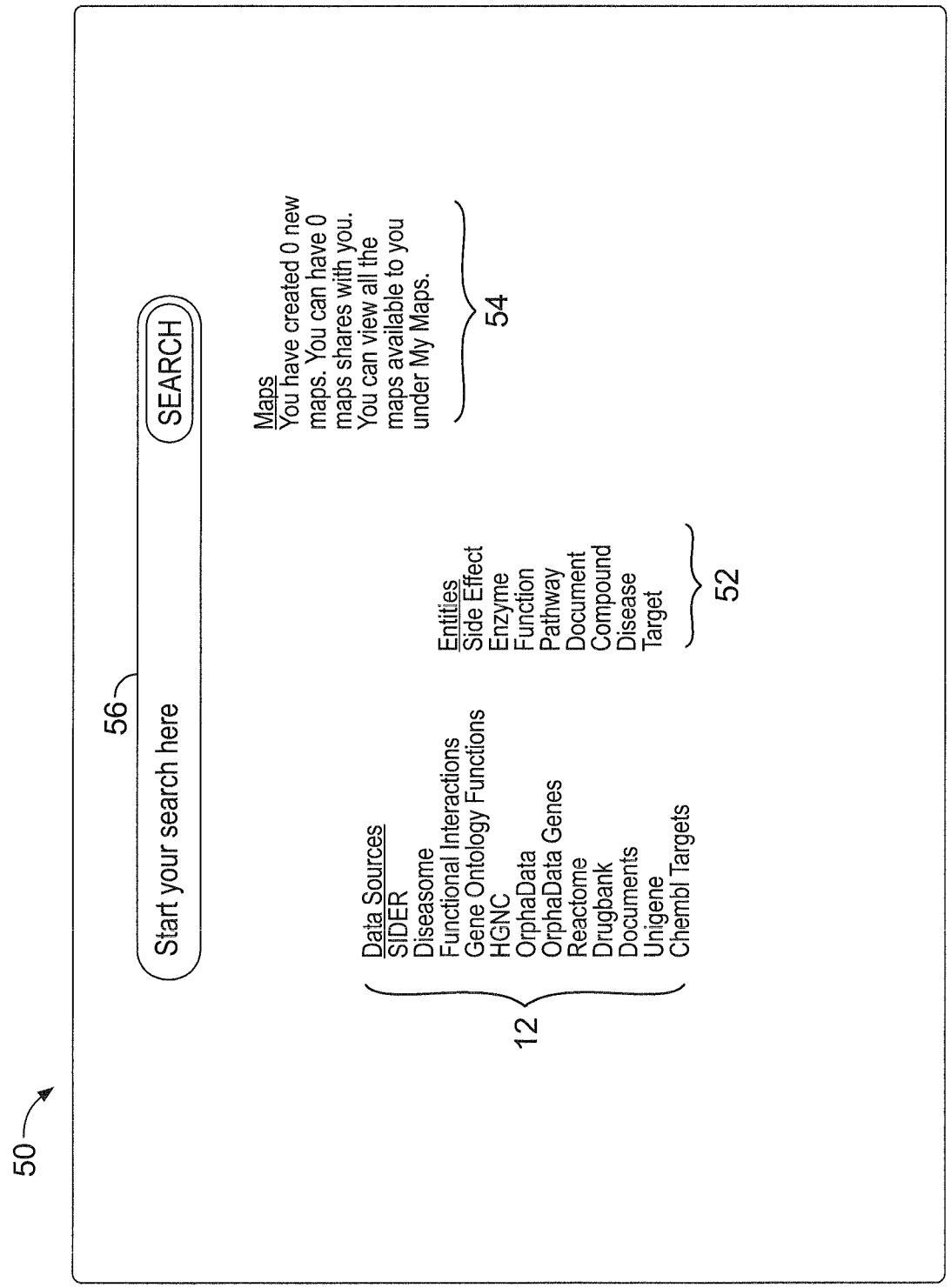
FIG. 3 is a computer display illustrating a search page for finding data entities from data sources according to one aspect of the present invention.
Figure 4:
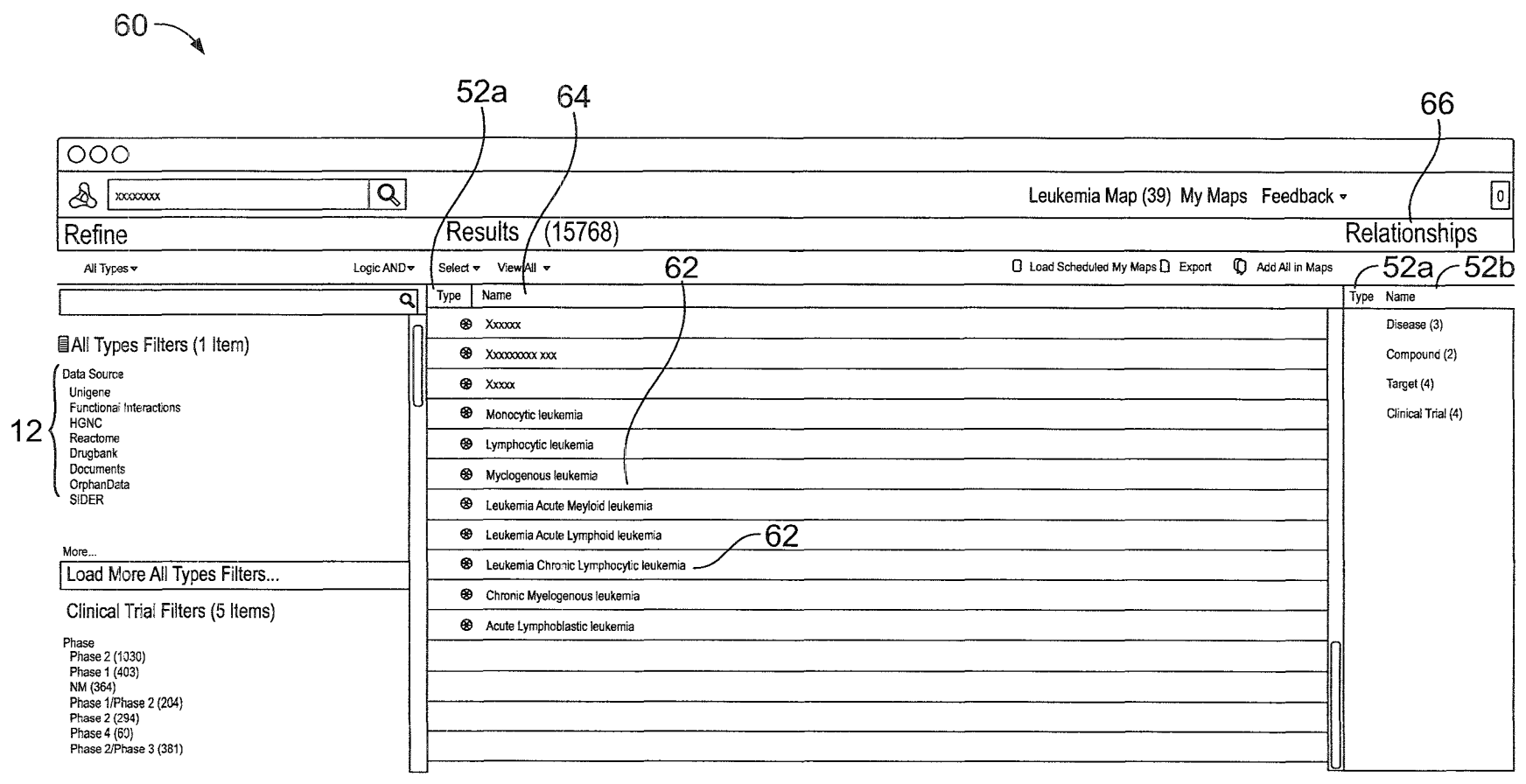
Figure 5:
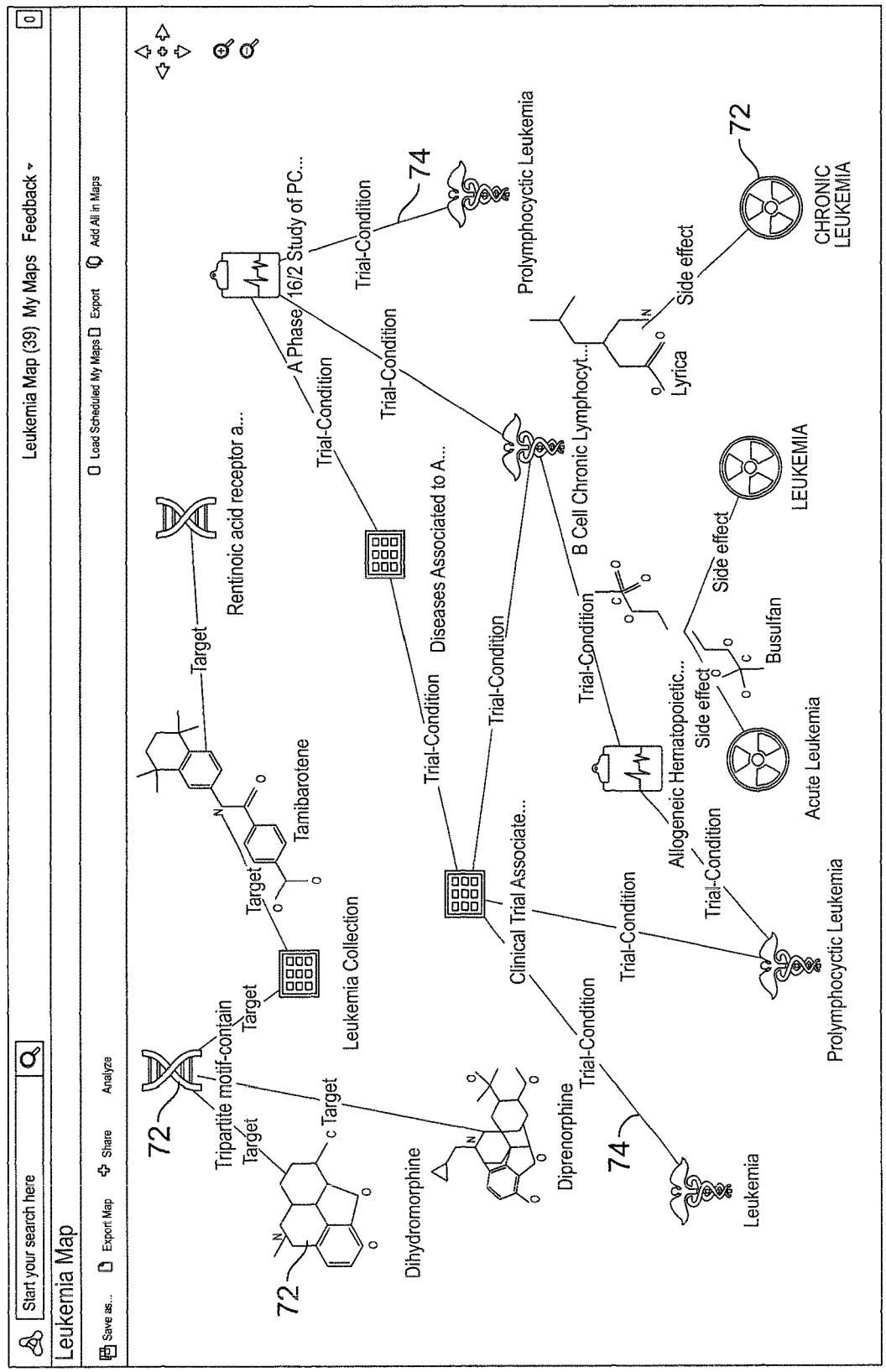
FIG. 5 is a computer display illustrating a knowledge map connecting master data entities to one another according to one aspect of the present invention.

FIGS. 3-5 illustrate one example of a master entity associative data network system 10 in use. In accordance with the illustrative example, the master entity associative data network system 10 is used as a data analytics and knowledge collaboration platform for users such as biologists, chemists, patent attorneys, market analysts, and clinical trial specialists. In particular, this system 10 allows users to be able search through and analyze data entities and their associations in a secure, interconnected data processor 14 which is continuously aggregated from internal and external sources 12. Within the data processor 14 are master entities that integrate all information and data from each data entity (e.g. protein, gene, compound, clinical trial, disease) including names, synonyms, symbols, meta-data properties, and associations to other data entities.

In the illustrated example, biomedical research, clinical trial design, and healthcare management are the subject data entities. The system 10 enables organizations to build secure, custom indices of data entities (i.e. domain specific entities), continuously scan document sources and allow users to collaborate in creation of intuitive knowledge maps in relation to these subject data entities.

The technology behind the system 10 includes connectors which enable for the continuous scanning of document repositories such as Sharepoint Teamsites, Documentum sites, patents, and/or electronic medical records. This allows users to easily search for documents which are related to maps the user is building which enhances the value of an organization's document repositories.

In the illustrated example, the master entity associative data network system 10 has a scalable infrastructure capable of handling petabytes of data using advanced compute clustering, dynamic sharding, and indexing technologies. Also, relational databases can be connected to this system providing the network system with data entities to be pulled and integrated with related data entities. This system 10 can be deployed behind an organization's firewall on existing hardware or on servers delivered at time of installation. Also, the system 10 can be connected to the organization's authentication system allowing users to be able to use their standard organizational username and password versus having to create a new username/password for this system 10. Alternatively, the system 10 is hosted in the cloud.

For example, data can be tied together through associations between data entities such as compounds, targets, and diseases. This allows scientist users to be able to generate more effective hypotheses and identify unexpected associations easily.

In this example, a web-based application is used and run in all modern web browsers (e.g. IE8/9, Firefox, Chrome, Safari, and Opera) and on all OS platforms (e.g. Windows XP, Windows 7, Mac OS X, Linux). Since the system 10 can be run by opening a browser, it eliminates the need for application installations and software update scheduling.

FIG. 3 depicts a search page 50 of the system 10 having semantic search capabilities allowing users to find particular data entities and/or documents. Also, this search page 50 allows a user to find all associated data entities. A user can also explore associations in an intuitive interface allowing the user to explore data within the information space around a data entity of interest. The search page 50 searches for data entities of a specific entity type 52 within the data sources 12. In the example shown in FIG. 3, the data sources 12 include SIDER, Diseasome, Functional Interactions, Gene Ontology Functions, HGNC, OrphaData, OrphaData Genes, Reactome, Drugbank, Documents, Unigene, and Chembl Targets. In the example shown in FIG. 3, the specific entity types 52 include Side Effect, Enzyme, Function, Pathway, Document, Compound, Disease, and Target. A search is performed by inputting information into a search bar 56. Also, maps can be created using the map generator 54 and can be viewed at another time within a user's account. In one example, the search page 50 includes a meta-data filter property identification that utilizes classification algorithms to identify the best meta-data types for each specific entity type 52 for use as search filters.

In one example, the search page 50 provides a semantic associative layer which allows users to find not only documents which mention a data entity but also actual representations of data entities themselves, their meta-data, and their associations with other data entities. In this example, the system 10 allows organizations to flexibly utilize this semantic associative layer across internal applications. Users can search for data entities of interest using aggregated search terms, boolean operators, and natural language phrases. Search results can be further filtered using dynamic, context driven text and numeric facets. All known associated data entities can be identified for each search result.

FIG. 4 depicts a results page 60 from a search performed using the search page 50 in FIG. 3. This results page 60 includes a list of data sources 12 from which data entities 62 were retrieved or extracted. Also, the results page 60 displays the names of each data entity 62 listed under the name bar 64 and the entity type symbol listed under the specific entity type symbol 52A. The relationships of data entities 66 is also shown on the results page 60 grouped in terms of the specific entity type symbol 52A and entity type name 52B.

FIG. 5 depicts a knowledge map 70 of master data entities 72 having connected associations 74 to one another within the master entity associative data network system 10. These knowledge maps 70 are created by the map generator 54 in FIG. 3.

In this example, the data processor 14 includes a web-based visualization and analysis application allowing users to create, search, and share structured knowledge maps 70 of associations 74 between master data entities 72. The system 10 can include computers) that are able to traverse networks to identify associations 74 between master data entities 72. This connecting of master data entities 72 can be performed with structured data sources or unstructured data sources (i.e. PubMed articles and documents pushed into Sharepoint). Users can build, share, and analyze these knowledge maps 70 of master data entities 72 and their associations 74 by searching for and saving sets of master data entities 72. These knowledge maps 70 provide a view of patterns of interconnection between master data entities 72 of interest and are used to continuously scan for new information and data as it becomes available and allow users to find other users that have created similar maps providing a collaborative knowledge exchange. These extracted associations 74 between master data entities 72 are based on extracted associations between data entities.

These knowledge maps 70 are created by users through interaction with the system's integrated data sources 12. These knowledge maps 70 are dynamic in that as new information or data is published in RSS feeds, external literature sources (e.g. patents, scientific literature sources such as Pubmed), and internal sources such as Sharepoint Teamsite documents, users will receive information alerts about new information relevant to one or more of the master data entities 72 in their maps. Alternatively, users can receive email updates about new information as it becomes available.

In this example, the master entity associative data network system 10 can also include advanced analytics that uses advanced inferencing and connectivity analytics approaches allowing users to discover unexpected associations, generate hypotheses, and share ideas with other users.

FIG. 6 depicts an example embodiment of the data processor 14. In this example, the data processor 14 includes semantic data core technology 80 which is used to aggregate and integrate data from a wide range of sources including computable relationship format (such as RDF), flat files, relational databases (e.g. Oracle, MySQL, Postgres), Sharepoint, Documentum, RSS feeds, and patent literature. The semantic data core technology 80 enables administrators within an organization to integrate data from internal and external sources and build a high-performance index of data entities and master data entities. The semantic data core 80 is a data entity index which is constantly being updated. Acting as a semantic data core index, the semantic data core 80 is used to continuously scan internal and external documents and RSS sources for references to each of the master data entities already in the system. The semantic data core technology 80 allows an organization to create and utilize a semantic data layer in conjunction with existing searches and informational systems. The semantic data core 80 acts as a controller for the entire master entity associative data network system 10.

FIGS. 7-10 depict computer screen views of different features of the data processor 14 such as the semantic data core 80 of FIG. 6.

Figure 7:
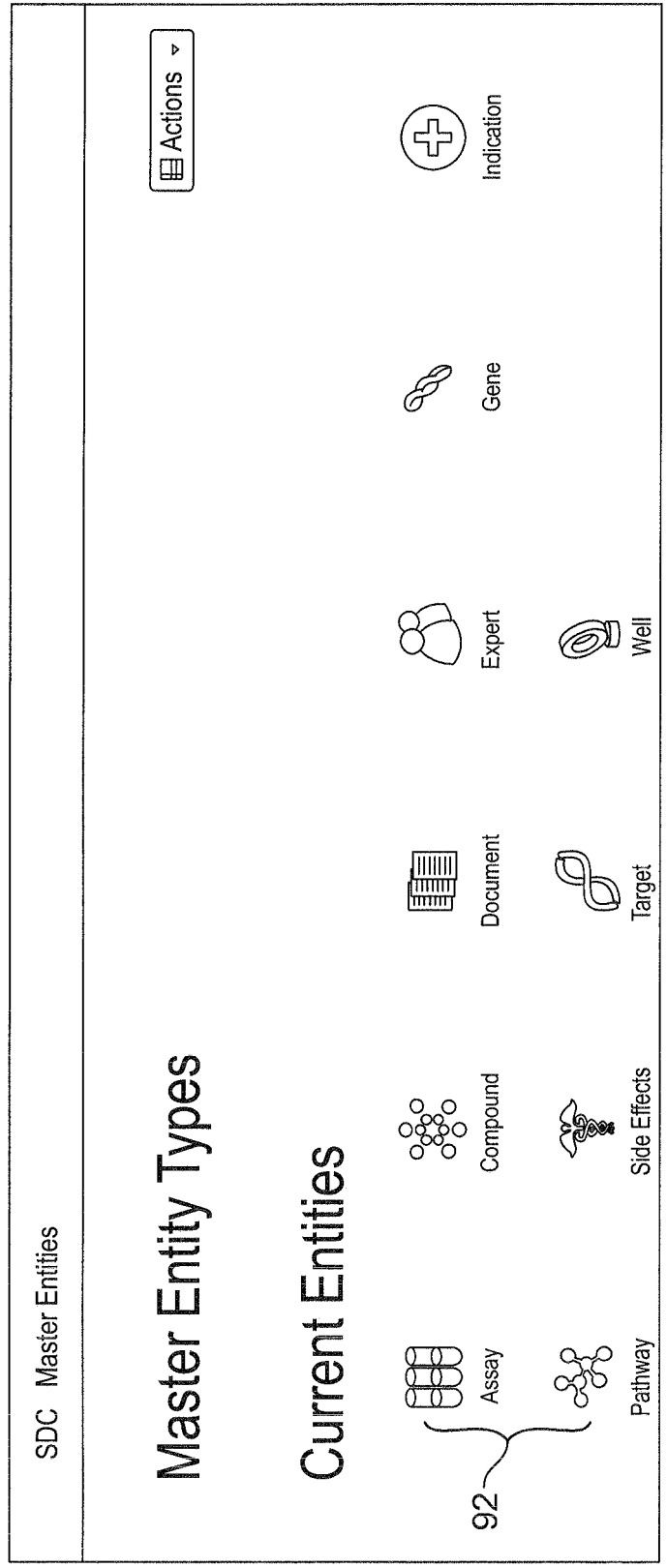
FIG. 7 is a computer display illustrating the master entity types using the data processor according to one aspect of the present invention.

FIG. 7 depicts a master entity type list 90 including one example of master entity types 92. The data processor 14 represents all the data as master entity types 92 that integrate all information from each data entity (e.g. protein, gene, compound, clinical trial, disease, assay, target, indication, pathway, and side effects) including names, synonyms, symbols, meta-data properties, and associations to other master data entities.

Figure 8:
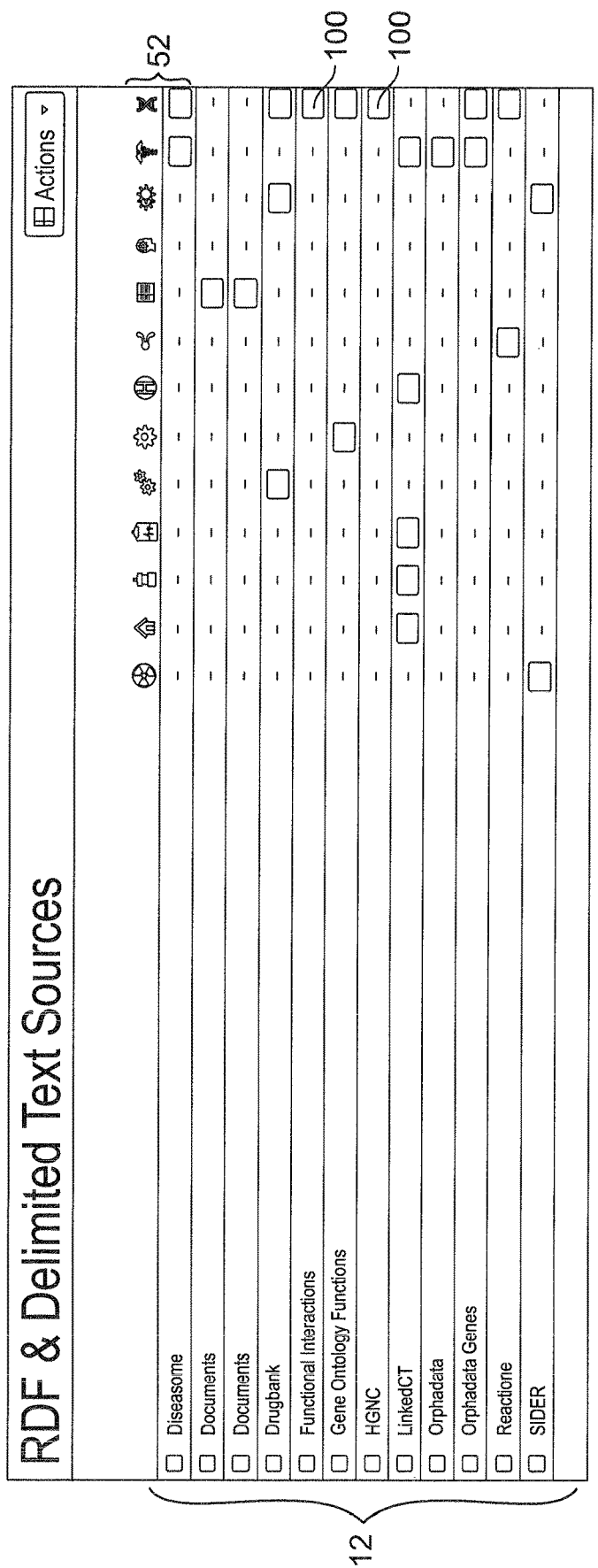
FIG. 8 is a computer display illustrating a table of data sources being crossed with specific entity types using the data processor according to one aspect of the present invention.

FIG. 8 depicts the aggregation and integration of data from computable relationship format sources (in the illustrative form of RDF sources) and delimited text sources within the data processor 14. This table further shows data sources 12 such as LinkedCT and SPIDER as being crossed with a variety of specific entity types 52. The green sections 100 of this table designate relevant connections/associations between sources 12 and the specific entity types 52.

FIG. 9 depicts aggregation and integration of data from data sources 12. In particular, the data source 12 types listed are live XML feeds, relational databases, and document sources. This table illustrates the ability to connect across different types of data sources whether structured (e.g. databases, XML, delimited) or unstructured (e.g. text from document sources). The data entities 62 are listed in the table with respect to a specific entity type 52.

Figure 10:
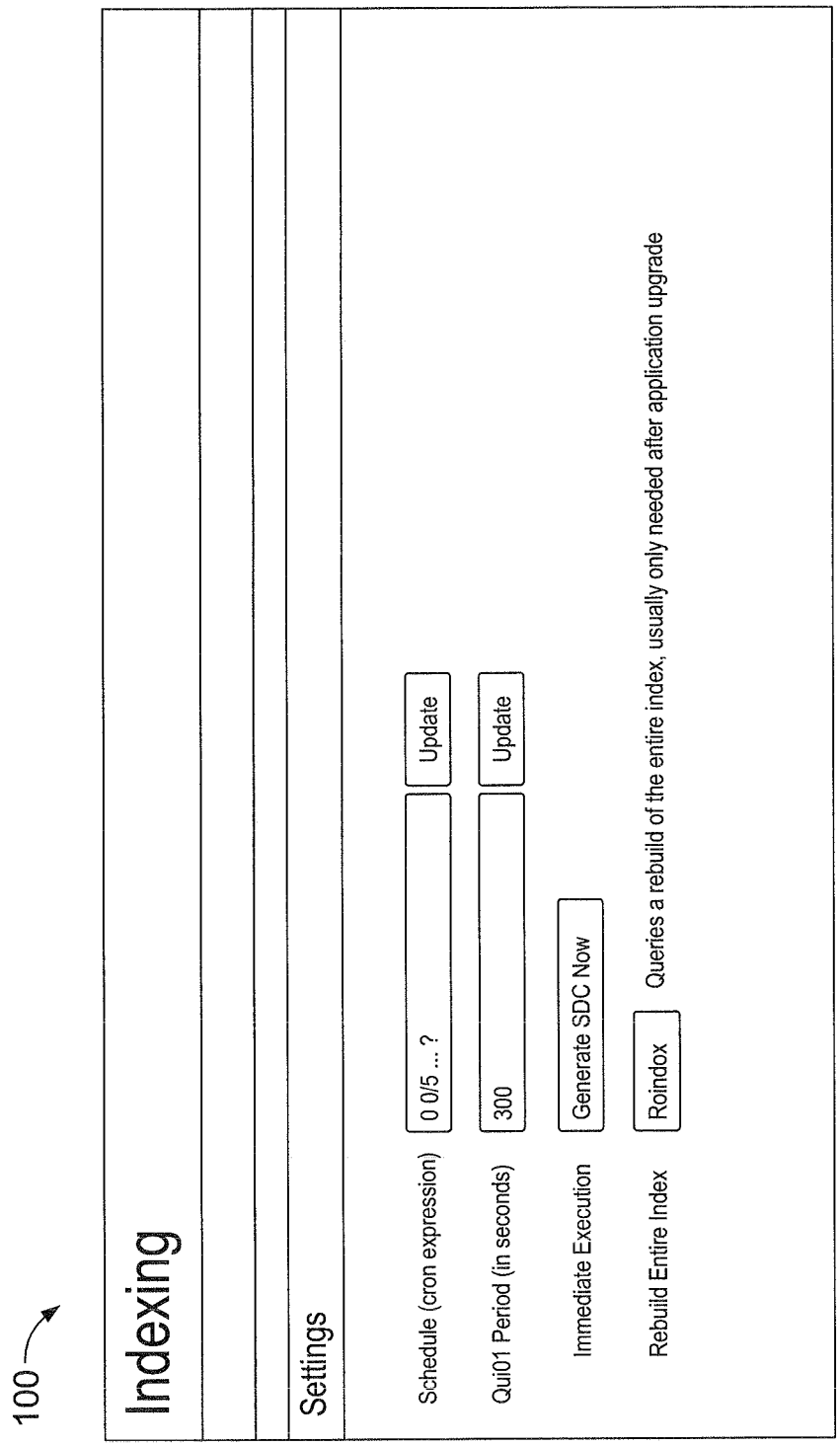
FIG. 10 is a computer display illustrating the ability to index data entities between other data entities using the data processor according to one aspect of the present invention.

FIG. 10 depicts a data index 100, more particularly a semantic data index, which is provided to all relevant data entities and associations between data entities in the system 10. The data index 100 is used to index data entities between other data entities using the data processor 14. This index 100 can be utilized through an application programming interface of the data processor 14 or alternatively via direct data queries to the underlying data index.

Figure 11:
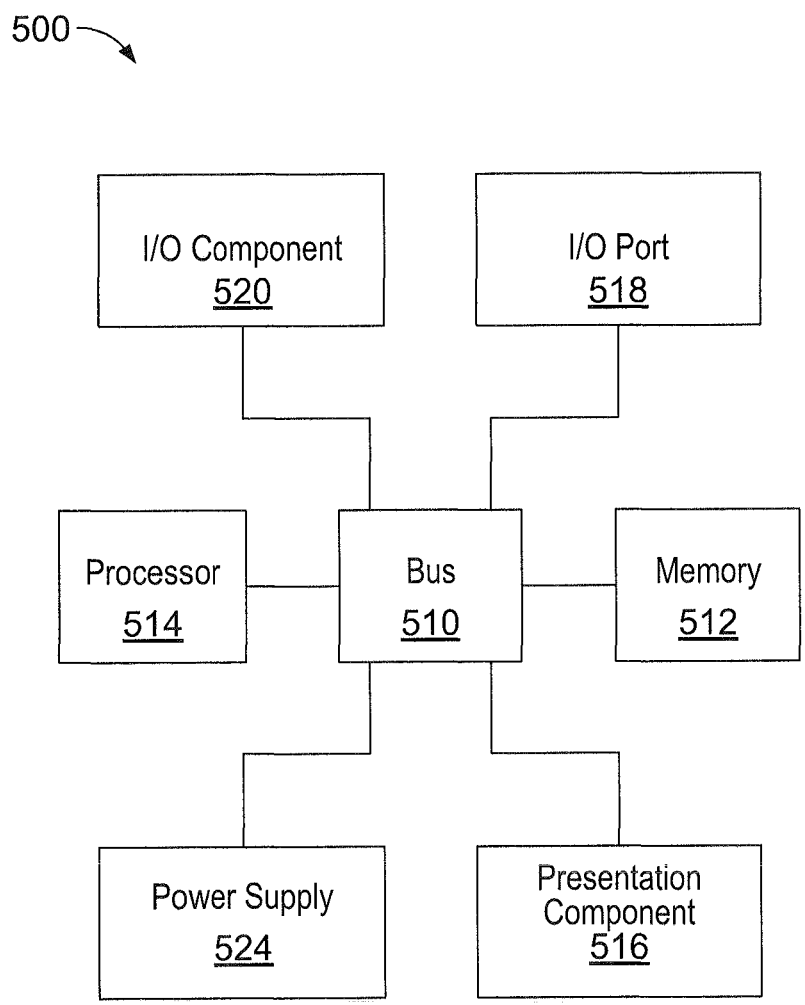
FIG. 11 is a schematic view of a computing device or system, suitable for implementing the systems and methods of the present invention.

FIG. 11 illustrates an example of a computing device 500 for implementing aspects of the illustrative methods and systems of the present invention. The computing device 500 is merely an illustrative example of a suitable computing environment and in no way limits the scope of the present invention. A "computing device," as represented by FIG. 11, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 524. One of skill in the art will appreciate that the bus 510 can include one or more busses, such as an address bus, a data bus, or any combination thereof. One of skill in the art additionally will appreciate that, depending on the intended applications and uses of a particular embodiment, multiple components can be implemented by a single device. Similarly, in some instances, a single component can be implemented by multiple devices. As such, FIG. 11 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 can be removable, non-removable, or any combination thereof.

Exemplary hardware devices are devices such as hard drives, solid-state memory, optical-disc drives, and the like.

The computing device 500 can include one or more processors 514 that read data from components such as the memory 512, the various I/O components 520, etc.

Presentation component(s) 516 present data indications to a user or other device. Exemplary presentation components 516 include a display device, speaker, printing component, vibrating component, etc.

The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, blue-tooth device, networking device, and the like.

One of skill in the art will appreciate a wide variety of ways to modify and alter the system and method of FIGS. 1-2, as well as the various components with which it interacts. For example, the one or more computing systems can be implemented according to any number of suitable computing system structures. Furthermore, some or all of the information contained in the one or more data sources alternatively can be stored in one or more remote databases (e.g., cloud databases, virtual databases, and any other remote database).

In some embodiments, it may be desirable to implement the method and system using multiple iterations of the depicted modules, controllers, and/or other components, as would be appreciated by one of skill in the art. Furthermore, while some modules and components are depicted as included within the system, it should be understood that, in fact, any of the depicted modules alternatively can be excluded from the system and included in a different system. One of skill in the art will appreciate a variety of other ways to expand, reduce, or otherwise modify the system upon reading the present specification.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented method of generating an integrated, high performance master entity associative data network for improved user interaction with data, the method comprising:
    converting data from one or more sources to a computable relationship format;
    importing the computable relationship format to a unified data core;
    extracting data entities from the computable relationship format in the unified data core, wherein each data entity is of a specific entity type having specific entity properties, associations to other data entities, and an assigned common identifier label that was assigned prior to extracting data entities;
    extracting the associations to other data entities;
    stitching a plurality of the data entities to each other to generate one or more master data entities, wherein stitching a plurality of the data entities to each other is based on at least one or more of the extracted associations of the data entities, specific entity properties, and the assigned common identifier label of the data entities, and wherein stitching the plurality of the data entities to each other comprises applying a stitching restriction, to prevent over-stitching, including blocking usage of an assigned common identifier label determined to be ambiguous when stitching the plurality of the data entities to each other;
    executing a parallel process to continuously scan for one or more stitching events using a parallelized algorithm;
    detecting the one or more stitching events via the parallelized algorithm, wherein detecting the one or more stitching events includes detecting that additional data is supplied from an additional source, wherein the supplying of the additional data from the additional sources triggers the one or more stitching events;
    generating master data entities that incorporate the additional data from the additional source in response to detecting the one or more stitching events;
    extracting, subsequent to generating one or more master data entities, additional associations between the one or more master data entities based on the extraction of associations to other data entities;
    presenting an intuitive user interface comprising one or more master data entities generated by stitching the data entities to each other enabling a user to interact with one or more master data entities; and
    mapping the one or more master data entities according to a user preference to form the master entity associative data network.

2. The computer implemented method of claim 1, further comprising indexing the one or more master data entities based on the stitching of the data entities to each other.

3. The computer implemented method of claim 1, further comprising assigning a unique master identifier label to each master data entity.

4. The computer implemented method of claim 1, further comprising sourcing the data from a relational database management system.

5. The computer implemented method of claim 1, wherein the data is selected from the group consisting of extensible markup language, delimited text, RSS feed, structured data, and semi-structured data.

6. The computer implemented method of claim 1, wherein stitching the data entities to each other is based on, at least in part, label attribution.

7. The computer implemented method of claim 1, further comprising creating a master entity type list based on the specific entity type and/or specific entity properties of extracted data entities.

8. The computer implemented method of claim 7, further comprising scanning a document for master data entities from the master entity type list.

9. The computer implemented method of claim 7, wherein the mapping of the one or more master data entities is based on the master entity type list.

10. The computer implemented method of claim 1, further comprising determining a range of facet values for specific entity properties of each specific entity type, wherein the determination of the range of facet values allows for filtration of data entities based on a search for a specific entity type.

11. The computer implemented method of claim 1, wherein:
    the generation of the one or more master entities comprises creating an ontological classification of the specific entity types from the one or more sources; and
    the one or more master data entities are generated based on specific entity types extracted from the one or more sources.

12. The computer implemented method of claim 1, further comprising indexing of all data across the one or more master data entities enables a search of any attribute for any master data entity.

13. The computer implemented method of claim 1, further comprising scanning a document, using a named entity recognition process, in order to identify an existence of one or more master data entities contained in the document.

14. The computer implemented method of claim 13, further comprising creating one or more novel data linkages between the document in which the one or more master data entities is located and the one or more master data entities contained in the document.

15. The computer implemented method of claim 1, wherein the computable relationship format comprises Resource Description Format (RDF).

16. A system providing an integrated, high performance master entity associative data network for improved user interaction with a data system comprising:
    one or more data sources storing a plurality of data entities, wherein each data entity is of a specific entity type having specific entity properties, associations to other data entities, and an assigned common identifier label; and
    a data processor configured to:
        extract data entities from the data sources and extract the associations to other data entities;

stitch a plurality of the data entities to each other to generate one or more master data entities, wherein stitching a plurality of the data entities to each other is based on at least one or more of the extracted associations of the data entities, specific entity properties, and the assigned common identifier label of the data entities, and wherein stitching the plurality of the data entities to each other comprises the data processor applying a stitching restriction, to prevent over-stitching, including blocking usage of an assigned common identifier label determined to be ambiguous when stitching the plurality of the data entities to each other;

execute a parallel process to continuously scan for one or more stitching events using a parallelized algorithm;

detect the one or more stitching events via the parallelized algorithm, wherein detecting the one or more stitching events includes detecting that additional data is supplied from an additional source, wherein the supplying of the additional data from the additional sources triggers the one or more stitching events; and generate master data entities that incorporate the additional data from the additional source in response to detecting the one or more stitching events.

17. The system of claim 16, wherein the data processor converts the data sources to a computable relationship format.

18. The system of claim 16, wherein the data processor assigns each master data entity a unique master identifier label for the purposes of identification of that particular master data entity.

19. The system of claim 18, wherein the data processor stitches the one or more master data entities to each other based on the unique master identifier label assigned to each of the one or more master data entities.

20. The system of claim 16, wherein the data processor indexes all of the data entities.

21. The system of claim 20, wherein the data processor indexes the data entities based on at least one or more of the extracted associations, specific entity properties, and the assigned common identifier label.

22. The system of claim 16, wherein the data processor maps the one or more master data entities according to a user preference to form the master entity associative data network.

23. The system of claim 16, wherein the data processor maps the one or more master data entities according to a plurality of user-defined master entity types to form the master entity associative data network.

24. The system of claim 23, wherein the plurality of user-defined master entity types are People, Events, Locations, and Groups.

25. The system of claim 23, wherein the plurality of user-defined master entity types are Proteins, Genes, Compounds, Pathways, and Diseases.

26. The system of claim 16, wherein the computable relationship format comprises Resource Description Format (RDF).

* * * * *